United States Patent [19]

Huber et al.

[11] Patent Number: 4,826,656

[45] Date of Patent: May 2, 1989

[54] SOFT-FROZEN WATER ICES

[75] Inventors: Clayton S. Huber; David M. Rowley; Jerry W. Griffiths, all of Provo, Utah

[73] Assignee: Pioneer Potato Company, Inc., Provo, Utah

[21] Appl. No.: 17,692

[22] Filed: Feb. 24, 1987

[51] Int. Cl.$^4$ .............................................. A23G 9/00
[52] U.S. Cl. .................................... 426/565; 426/573; 426/654
[58] Field of Search ............... 426/565, 566, 567, 654, 426/573

[56] References Cited

U.S. PATENT DOCUMENTS

| | | | |
|---|---|---|---|
| 3,684,523 | 8/1972 | McGinley | 426/330.2 |
| 3,761,285 | 9/1973 | Nagasawa et al. | 426/565 |
| 3,914,440 | 10/1975 | Witzig | 426/565 |
| 3,993,793 | 11/1976 | Finney | 426/654 |
| 3,996,389 | 12/1976 | Osborne | 426/654 |
| 4,242,367 | 12/1980 | Igoe | 426/565 |
| 4,264,637 | 4/1981 | Braverman | 426/565 |
| 4,626,441 | 12/1986 | Wolkstein | 426/565 |

OTHER PUBLICATIONS

Arbuckle, Ice Cream 3rd ed. Avi Pub., Co. Inc. Wesport Conn., 1977 pp. 292-302.

*Primary Examiner*—Jeanette Hunter
*Attorney, Agent, or Firm*—Thorpe, North & Western

[57] ABSTRACT

A smooth textured soft frozen water ice having a consistency similar to soft frozen fat containing dairy products and having a solids content between about 18–26% w. at an overrun of between about 25–70% is prepared by mixing a homogeneous dry blend premix in cold water and freezing in a conventional soft serve freezer. The soft frozen product has a draw temperature between about 18°–21° F. and primarily contains: (a) 0.05 to 0.5% w. of a stabilizing mixture consisting of a major amount of a first stabilizer preferably selected from the group consisting of xanthan gum, guar gum, carageenen and locust bean gum and mixtures thereof and a minor amount of CMC, wherein the weight ratio of CMC to the first stabilizer is between about 0.25:1.0 and 0.75:1.0; (b) 17 to 25% w. of a sweetening agent such as sucrose, fructose or sucrose-corn syrup solids mixtures; (c) 0.01 to 5.0% w. of a flavoring agent; and (d) 0.0 to 1.0% w. of a fruit acidifying agent. Xanthan gum-CMC mixtures are preferred stabilizer mixtures in obtaining soft frozen water ices of smooth and creamy consistency.

22 Claims, No Drawings

SOFT-FROZEN WATER ICES

BACKGROUND OF THE INVENTION

This invention relates to soft frozen non-dairy desserts. More particularly, this invention relates to soft frozen naturally and artificially fruit flavored water ices having small crystal size, smooth consistency and uniformity of texture.

Soft frozen desserts ranging from dairy products such as ice milk, custard, ice cream and yogurt to non-dairy water ice items such as slushes, shave ices and Sno-Kones (TM) are becoming more readily available through fast food and convenience outlets. Dairy frozen desserts are of more limited availability due to the fact that dairy containing products are more strictly regulated than their non-dairy counterparts. However, frozen water ice desserts have not attained the same popularity as frozen dairy desserts and are not generally as palatable in that they tend to have relatively large ice crystal sizes and not be as smooth to the taste. Moreover, when marketed in soft form such as slushes, Sno-Kones (TM), or shave ices, the flavoring often separates from the ice crystals and drains to the bottom of the serving container leaving an upper portion consisting mainly of ice crystals and the bottom portion consisting of melted ice and flavoring syrup.

OBJECTS AND BRIEF SUMMARY OF THE INVENTION

It is an object of the present invention to provide a soft frozen water ice product which is smooth to the taste, is of uniform flavor consistency, is stable, is relatively slow melting and which can be frozen and served from conventional soft serve freezers used for dairy products.

It is also an object of this invention to provide a dry, powdered water ice mix which is homogeneous and readily soluble in cold water.

These and other objects may be accomplished by thoroughly dry blending ingredients to obtain a homogeneous mixture which, when rehydrated, will have a solid content of between about 18 to 26% weight, will be made up of 17 to 25% weight of one or more sweeteners, 0.05 to 0.5% weight of a specified stablizer mixture, 0.01 to 5.0% weight of natural or artificial flavoring agents and 0 to 1.0% weight of a fruit acidifying agent. The combined sweetening agent, stabilizer mixture, flavoring agents and, if used, fruit acidifying agent must be sufficiently balanced to provide a mixture that will readily dissolve in cold water and, when frozen, will provide a stable soft frozen water ice at an overrun of between about 25–70% at a draw temperature of between about 18°–21° F.

DETAILED DESCRIPTION OF THE INVENTION

The homogeneity of the dry blend is critical to the formation of a smooth, creamy textured soft frozen ice. The stabilizers must be uniformly dispersed throughout the soft frozen ice to obtain the desired texture and product stability. Moreover, the combination of stabilizers is also critical to the obtaining of a smooth, stable, slow melting product. The flavoring agents are matters of choice and the addition of a fruit acidifying agent is prompted by the choice of flavoring agent used.

Dairy frozen desserts have been preferred over water ices due, in part, to their smooth and creamy, as distinguished from course and grainy, texture. Smoothness is created primarily by the fat content of dairy products. The less fat in the product, the more granular is the texture. Stabilizers have been utilized in frozen dairy desserts to produce additional smoothness in body and texture, to retard or reduce ice crystal growth during storage, to provide uniformity of product and resistance to melting. Stabilizers function either through their ability to form gel structures in water or in their ability to combine with water as water of hydration and function as thickening agents. It is the ability of small percentages of stabilizer to absorb and bind relatively large amounts of water which produces good body, smooth texture and slow melt down in frozen dairy products. Usage rates in ice cream compositions generally vary from about 0.15 to 0.50%.

However, some stabilizers utilized for dairy products may not function as readily in water ices. Most dairy products are prepared by first heating in order to bring all the ingredients into solution. Thus, the fact that some stabilizers may be of limited solubility in cold or ambient water is not important in making frozen dairy desserts. Moreover, many water ices are frozen solid with a wooden handle inserted in them, e.g., such as marketed under the tradename Popsicle, and stabilizers may or may not be essential.

In the present invention, it is imperative that the stabilizer mixture be soluble in cold water, i.e. at 50° F. or lower. Also, it is essential that the stabilizer be uniformly dispersed in the dry mixture so that when added to cold water it will immediately be evenly distributed throughout the solution. The stabilizer found to be most useful in the present invention is a mixture having, as a major component, a first stabilizer selected from the group consisting of xanthan gum, guar gum, carageenan, or locust bean gum and, as a second stabilizer, a minor amount of CMC (sodium carboxymethylcellulose).

Xanthan gum is a high-molecular weight (5–10 million) water-soluble natural gum and is a heteropolysaccharide made up of building blocks of D-glucose, D-mannose, and D-glucuronic acid residues. It is produced by pure culture fermentation of glucose with *Xanthomanas campestris* and is stable over a wide pH range. In addition, xanthan gum has similar viscosity in both hot and cold solutions. Guar gum is also stable over a wide pH range.

Of the above stabilizers to be combined with CMC, xanthan gum appears to be far superior followed in order of preference by guar gum, carageenan and locust bean gum. However, these do not provide a product having as good a texture and resistance to meltdown as xanthan gum. Soft frozen products containing a xanthan gum-CMC stabilizer had the least fluid from meltdown upon prolonged standing and the soft frozen product had a smoother, creamier texture. Guar gum-CMC stabilizer combinations provided a similar smooth texture but left more liquid from meltdown. Locust bean gum-CMC combinations provided a product that had a more frothy meltdown. Other stabilizers conventionally used in ice cream manufacture such a sodium alginate, gelatin, gum tragacanth, India gum, agar-agar and pectin may also be used as first stabilizer components with some degree of success but are less preferable in that the product texture and meltdown are not as good as with the more preferred stabilizer combinations. It is also within the scope of the invention to combine or blend together mixtures of the first stabilizer components and combine them with CMC.

Xanthan gum, locust bean gum, guar gum and CMC function as thickening agents whereas carrageenan, agar-agar, alginates and pectin are gelling agents. While not wishing to be bound by any theory, it would appear that, with the possible exception of carageenan, thickening agents function as preferred stabilizers over gelling agents in providing the desired properties to soft frozen water ices.

As previously stated, all stabilizer combinations, to be functional, must be freely soluble in cold water.

The stabilizer mixtures should be present in sufficient amounts that, when rehydrated, it will amount to between about 0.05 and 0.5% w. and preferably between about 0.10 and 0.20% w. of the total composition. The ratio of CMC to first stabilizer or mixture of first stabilizers wil vary from about 0.25:1.0 to about 0.75:1.0 and preferably between about 0.33:1 to about 0.66:1. Most preferably, the weight ratio of CMC to first stabilizer will be about 0.5:1.

While sucrose is the preferred sweetener, other sweetening agents may also be employed. In order to maintain an appropriate total solids content in the overall composition of between about 18–26% w. the sweetening agent should be present in amounts of between about 17 and 25% w. At a perferable solids content range of between about 20.1 and 25% w., the sweetening agent range will be between about 20 and 24% w. Since various sugars or sweetening agents have different relative sweetness (based on sucrose at a value of 100), the amount used to obtain the desired sweetness in the soft frozen water ice product may vary. Hence, if fructose (relative sweetness of 173) is utilized, it may be preferable to combine the fructose with a corn syrup. High conversion corn syrup (62 DE) has a relative sweetness of 68 whereas low conversion corn syrup (32 DE) has a relative sweetness of 42. Replacing a portion of sucrose or other sugar with corn syrup solids will generally result in a smoother textured final product. Also, potent sweetening agents, both nutritive and non-nutritive, of high relative sweetness, such as aspartame, saccharin, acesulfame K, alitame, thaumatin, cyclamate, glycyrrhizin, stevioside, L-sugars, neohesperidin, and the like may be used if balanced with an appropriate amount of a carbohydrate having a low relative sweetness such as maltodextrins.

All of the above are categorized generally as sweetening agents. However, sucrose, fructose, and corn syrup solids are preferred sweetening agents. Most particularly preferred sweetening agents are sucrose or a combination of sucrose and corn syrup solids. Since relative sweetness is determined subjectively, the amount and blend of sweetening agents is a matter of choice. What is important is that sufficient sweetening agent be used to provide the desired sweetness and solids content to the soft frozen water ice product. Since sugars also affect the freezing point of the product, the amount and molecular weights of the sugars used are also to be taken into consideration.

The flavoring agents may be any natural or artificial flavor desired and may range from single fruit flavors such as peach, coconut, cherry, strawberry, blueberry, pineapple, orange, etc. and blends thereof to more exotic or unusual flavors such as bubblegum. Generally, these flavoring agents will be present in amounts of between about 0.01 to 5.0% w. in the overall composition. When natural flavoring agents such as fruit powders are used, the amount of flavoring agent will tend to be in the upper range due to fibers and other natural ingredients. Preferably, the flavoring agent will be present in amounts of between about 0.01 to 1.0% W for artificial flavors. For natural fruit powders, the preferred range is between about 0.2 and 5.0% weight.

In some flavor selections, it is desired to enhance the tartness of the flavor. In such cases, from 0 up to about 1.0% w., and preferably 0 to about 0.5% w., of a fruit acid such as citric acid, malic acid or tartaric acid may be added to the composition.

It is also within the scope of the invention to fortify the composition with vitamins and/or minerals to provide an overall blend that will supply some or all of the U.S. RDA of selected vitamins and/or minerals on a per serving basis.

The various ingredients are placed in a suitable mixing apparatus such as a rotating gravity, paddle or helical ribbon mixer and dry blended until thoroughly and homogeneously mixed. The dispersion of the stabilizer with the sweetening agent, as the major component, is critical to the obtaining of a smooth textured product. The variations in densities of the ingredients making up the blended mixture are not so great that they will settle or separate significantly during storage. The dry blended product will consist of between about 0.2 and 2.8% w., and preferably between about 0.4 and 1.1% w., stabilizer mixture. The ratio of first or major stabilizer to CMC will be between about 0.25:1 and 0.75:1, and preferably be between about 0.33:1 to 0.66:1. Xanthan gum is the preferred stabilizer to mix with CMC. Preferably the weight ratio of CMC to xanthane gum will be about 0.5:1. The dry blend will consist of between about 65 to 98% w., and preferably between about 80 to 97% w. of the sweetening agent which is the major component. About 0.04 to 27.8 of the dry blend will be flavoring agent. For natural fruit powders, the preferred range is between about 0.8 and 27.8% w. and for artifical flavors, the preferred range is between about 0.04 and 2.8% w. Finally, about 0 to 3.0% w. and preferably between about 0 to 2.0% w. of the dry composition will be a fruit acid.

Beside fortifying with vitamins and minerals, as previously mentioned, other ingredients, such as coloring aids, which are compatible and do not affect the properties of the frozen product may also be utilized.

When ready for freezing, the dry blend is dissolved in an appropriate amount of cold water, preferably 50° F. or lower, to provide the desired solids content.

The aqueous solution containing the dissolved solids is then quickly frozen, while being agitated to incorporate air, to provide the desired soft frozen product having the desired overrun and draw temperature. With a proper liquid mixture and freezing conditions, the formation of ice crystal size is controlled to give the desired degree of smoothness in body and texture.

Overrun is defined as the volume of frozen product obtained in excess of the volume of the liquid mixture before freezing and is usually expressed in terms of "percent overrun". This increased volume is composed primarily of air incorporated during the freezing process. Generally speaking, the percent overrun is proportional to the solids content of the mixture, i.e. the higher the solids content the higher the percent overrun. The usual percent overun for water ices is stated to be in the 24–30% range.

However, in the present invention, it has been found that the percent overrun is suprisingly much greater varying between about 25 to 70% at a draw temperature of between about 18°-21° F. This is unexpected because of the relatively low solids content of between about 18 to 26% by weight. The freezing time should be as fast as practical due to the fact that ice crystals formed quickly are smaller than those formed more slowly. It is therefore preferred to freeze and draw from the freezer in as short a time as possible to maintain the integrity of the frozen product.

The function of the freezing process is to freeze a portion of the water of the mix and to incorporate air into the mix. The ice crystals formed are practically pure water in a solid form and thus the sugar or other sweetening agent, stabilizers and flavoring agents become more concentrated in the remaining liquid water. Thus, the soft frozen product drawn from the freezer for service is a ternary mixture of ice crystals, air cells and unfrozen liquid containing sugars or other sweetening agents, stabilizers and flavoring agents. Although the soft frozen product is a complicated mixture, it is believed that the air cells are dispersed in a continuous liquid phase with embedded ice crystals. The stablizers mixture, and a xanthan gum-CMC combination in particular, combine with the liquid water and control ice crystal size and air cell uniformity thereby promoting the formation of a smoothly, creamy textured product which is stable and which has a slow meltdown.

The following examples are illustrative of the invention.

EXAMPLE I

Into a ribbon blender was blended 3.43 gms. of xanthan gum, 1.7 gms. of CMC, 870 gms of sucrose, 4.17 gms. of a grapefruit flavoring and 17.35 gms of citric acid. The product was thoroughly blended and then dissolved in three liters of 42° F. water to form a liquid mix having 22.99% w. solids. The mix was stirred until all the ingredients were in solution. The mix was then placed in a Mitsubishi freezer at a No. 4 setting and frozen to a draw temperature of 19°-20° F. The soft frozen product had an overrun of about 52%. The body and texture of the product was smooth and creamy and, upon standing for 60 minutes at ambient temperature, demonstrated no noticable meltdown. After 120 minutes there was only a 10% meltdown.

EXAMPLE II

The procedure of Example I was repeated using 1.0 grams of artificial cherry flavor as the flavoring agent. Otherwise, everything remained the same. The resulting soft frozen product had an overrun of about 63% and had a smooth, creamy texture similar to ice cream. Upon standing for 60 minutes at ambient conditions, there was very little liquid from meltdown. After 120 minutes, there was only a 4% liquid meltdown.

EXAMPLE III

The procedure of Example I was generally followed using a Taylor freezer. There was used 3.43 grams of guar gum as the stabilizer and 1.0 grams of an artificial cherry flavoring agent. The other parameters remained the same. The soft frozen product retained a smooth, creamy consistency and had an overrun of about 46%. After standing for 60 minutes, there was very little liquid from meltdown. However, after 120 minutes, the melt down had increased to about 25%.

EXAMPLE IV

The procedure of Example II was followed using 3.43 grams of carageenan as the stabilizer and 1.0 grams of an artificial cherry flavoring agent. The resulting soft frozen product had an overrun of about 45% and, although relatively smooth and creamy, did not have as good a texture as products made with xanthan or guar gums. The meltdown after 60 minutes was practically nil and after 120 minutes was about 30%.

EXAMPLE V

Example IV was repeated using 3.34 grams of locust bean gum as the stabilizer. The other parameters remained the same. Soft frozen product was produced in a Mitsubishi freezer. The overrun was about 45% and the texture, although still smooth and creamy, was not as good as in the preceding examples. The meltdown, after 120 minutes, was 36% and was somewhat frothy.

EXAMPLE VI

Following the procedure of Example III using 3.43 grams of xanthan gum as stabilizer and 2.0 grams of an artificial peach flavoring, a soft frozen product, having an overrun of about 33%, was obtained using a Taylor freezer. The product had a draw temperature of about 19° F. and was smooth and creamy in texture. After 60 minutes at ambient conditions, there was 2% meltdown and, after 120 minutes, there was 10% meltdown.

EXAMPLE VII

The general procedure of Example I was followed using 3.43 grams of xanthan gum, 1.7 grams of CMC, 653 grams of sucrose, 217 grams of corn syrup solids, 1 gram of artificial cherry flavoring and 17.35 grams of citric acid. The above components were uniformly mixed and dissolved in 3 liters of water at about 42° F. to provide a solution having 22.99% solids. When frozen in a Mitsubishi freezer, there was an overrun of about 44%. The product had a draw temperature of 19°-20° F. and was smooth and creamy in texture. Upon standing for 60 minutes at ambient conditions, there was a 6.5% meltdown.

The same mixture run through a Taylor freezer had an overrun of 38% and showed more noticable melting. After 60 minutes there was about 25% meltdown and after 120 minutes, the meltdown had increased to about 33%.

This soft frozen water ice product made from a combination of sucrose and corn syrup solids was surprising in that it had a smooth and creamy texture comparable to a premium grade of ice milk.

EXAMPLE VIII

The procedure of Example VII was followed using 870 grams of fructose as the sweetener. The soft frozen product was somewhat softer in consistency at a draw temperature of 19°-20° F. and at an overrun of about 62%. The product had a smooth, creamy texture. After standing for 60 minutes at ambient conditions, there was a 7.8% meltdown. However, after 120 minutes, nearly all of the product had melted.

The same product frozen in a Taylor freeze was harder than from the Mitsubishi and had a draw temperature of 18° F. After 60 minutes, there was very little melting exhibited and after 120 minutes, there was a meltdown of about 30%.

EXAMPLE IX

The procedure of Example VIII was followed using 870 grams of sucrose as the sweetener. The product showed better consistency than when using fructose. There was an overrun of about 50% using a Misubishi freezer at a draw temperature of 19°–20° F. The meltdown was 6.2% after 60 minutes and 31% after 120 minutes.

EXAMPLE X

The following table contains a representative range of calculated, hypothetical mixtures with projected overrun, meltdown and texture data. The projected results can be realistically expected based on data already obtained.

| | COMPOSITION IN PERCENT BY WEIGHT OF VARIOUS SOFT FROZEN WATER ICE MIXES OBTAINED BY COMBINING A PREMIX WITH COLD WATER AND FREEZING | | | | | | | | | | | | | | | |
|---|---|---|---|---|---|---|---|---|---|---|---|---|---|---|---|---|
| | MIX NUMBER | | | | | | | | | | | | | | | |
| INGREDIENTS | 1 | 2 | 3 | 4 | 5 | 6 | 7 | 8 | 9 | 10 | 11 | 12 | 13 | 14 | 15 | 16 |
| Major Stabilizer | .09 a | .09 a | .06 a | .09 a | .16 a | .09 d | .09 b | .09 c | .09 a | .05 d | .03 a | .09 a | .04 b | .09 a | .40 a | .27 b |
| CMC | .04 | .04 | .04 | .04 | .04 | .04 | .04 | .04 | .03 | .02 | .02 | .04 | .02 | .04 | .10 | .20 |
| Sweetening Agent | 22 e | 22 f | 22 e | 22 e | 22 e | 22 e | 22 e | 22 e | 12 e 10 i | 20 f | 22 e | 12 e 10 g | 12 e 10 g | .001 h 22 i | 22 e | 22 f |
| Flavoring Agent | .11 z | .01 p | .11 z | .11 z | .05 t | .10 u | .3 q | .08 n | .11 z | .05 t | .1 w | .08 v | .06 x | .1 y | .07 r | .05 s |
| Acidifying Agent | .45 j | .35 j | .45 j | .45 j | .30 j | .45 j | 0 | .40 k | .45 j | 0 | .4 m | .4 k | .45 j | .45 j | .4 j | .4 j |
| Total Solids | 23 | 22.5 | 22.7 | 20.6 | 22.5 | 22.7 | 22.4 | 22.6 | 22.7 | 20.1 | 22.5 | 22.6 | 22.6 | 22.7 | 23 | 22.9 |
| Water | 77 | 77.5 | 77.3 | 79.4 | 77.5 | 77.3 | 77.6 | 77.4 | 77.3 | 79.9 | 77.5 | 77.4 | 77.4 | 77.3 | 77 | 77.1 |
| Draw Temp. °F. | 19 | 18 | 20 | 20 | 18 | 19 | 18 | 18 | 20 | 19 | 18 | 18 | 19 | 18 | 18 | 18 |
| Texture | C | C | S | S | C | G | S | S | S | G | S | C | S | S | C | C |
| % Meltdown 60 Min | 4 | 10 | 11 | 12 | 10 | 15 | 10 | 12 | 16 | 20 | 15 | 4 | 10 | 14 | 2 | 4 |
| % Meltdown 120 Min | 15 | 31 | 29 | 32 | 25 | 36 | 26 | 30 | 29 | 36 | 32 | 16 | 23 | 27 | 6 | 10 | a = Xanthan Gum
b = Guar Gum
c = Carageenan
d = Locust Bean Gum
e = Sucrose
f = Fructose
g = Corn Syrup Solids 42 DE
h = Aspartame
i = Maltodextrin
j = Citric Acid
k = Malic Acid
m = Tartaric Acid
n = Black Cherry Flavor
p = Peach Flavor
q = Root Beer Flavor
r = Blueberry Flavor
s = Lime Flavor
t = Bubblegum Flavor
u = Lemon Flavor
v = Pineapple Flavor
w = Guava Flavor
x = Passion Fruit Flavor
y = Orange Flavor
z = Pink Grapefruit Flavor
G = Grainy
S = Smooth
C = Creamy While the above examples and description present the best presently known modes of utilizing the invention, it will become apparent to one skilled in the art that other ingredients, combinations and variations in mixing and processing not specifically disclosed will also fall within the scope of the invention, which is to be limited only by the scope of the appended claims.

I claim:

1. A smooth textured soft frozen water ice having a solids content between about 18–26% w., a water content between about 74–82% w. and an overrun of between about 25–70% consisting essentially of;
   (a) 0.05 to 0.5% w. of a stabilizing mixture consisting of a major amount of a first stabilizer selected from the group consisting of xanthan gum, guar gum, carageenen, locust bean gum, sodium alginate, gelatin, gum tragacanth, India gum, agar-agar and pectin and mixtures thereof and a minor amount of a second stabilizer consisting of CMC, wherein the weight ratio of CMC to the first stabilizer is between about 0.25:1.0 and 0.75:1.0;
   (b) 17 to 25% w. of a sweetening agent;
   (c) 0.01 to 5.0% w. of a flavoring agent; and
   (d) 0.0 to 1.0 % w. of a fruit acidifying agent.

2. A soft frozen water ice according to claim 1 wherein the first stabilizer is a member selected from the group consisting of xanthan gum, guar gum, carageenen and locust bean gum and mixtures thereof.

3. A soft frozen water ice according to claim 2 wherein the draw temperature is between about 18° to 21° F.

4. A soft frozen water ice according to claim 3 wherein the sweetening agent is a member selected from the group consisting of sucrose, fructose, and corn syrup solids.

5. A soft frozen water ice according to claim 4 wherein the overrun is between about 30 to 65%.

6. A soft frozen water ice according to claim 5 wherein the first stabilizer is xanthan gum.

7. A soft frozen water ice according to claim 6 wherein the sweetening agent is sucrose or a mixture of sucrose and corn syrup solids.

8. A soft frozen water ice according to claim 6 wherein the ratio of CMC to xanthan gum is about 0.5:1.0.

9. A soft frozen water ice according to claim 2 wherein the weight ratio of CMC to the first stabilizer is between about 0.33:1.0 and 0.66:1.0.

10. A soft frozen water ice according to claim 9 wherein the stabilizing mixture is present in amounts ranging from about 0.10 to 0.20% by weight.

11. A soft frozen water ice according to claim 2 wherein the flavoring agent is an artificial flavor and is present in an amount between about 0.01 to 0.5% w.

12. A soft frozen water ice according to claim 2 wherein the flavoring agent is a natural fruit powder and is present in an amount between about 0.2 to 5.0% w.

13. A dry, particulate, homogeneous mixture for the production of flavored soft frozen water ices consisting of
   (a) 0.2 to 2.8% w. of a stabilizing mixture consisting of a major amount of a first stabilizer selected from the group consisting of xanthan gum, guar gum, carageenen, locust bean gum, sodium alginate, gelatin, gum tragacanth, India gum, agar-agar and pectin and mixtures thereof and a minor amount of a second stabilizer consisting of CMC, wherein the weight ratio of CMC to the first stabilizer is between about 0.25:1.0 and 0.75:1.0;
   (b) 65 to 98% w. of a sweetening agent;
   (c) 0.04 to 27.8% w. of a flavoring agent; and
   (d) 0 to 5.5% w. of a fruit acidifying agent.

14. A dry, particulate, homogeneous mixture according to claim 13 wherein the first stabilizer is a member selected from the group consisting of xanthan gum, guar gum, carageenen and locust bean gum and mixtures thereof.

15. A dry, particulate, homogeneous mixture according to claim 14 wherein the sweetening agent is a member selected from the group consisting of sucrose, fructose and cor syrup solids.

16. A dry, particulate, homogeneous mixture according to claim 15 wherein the first stabilizer is xanthan gum.

17. A dry, particulate, homogeneous mixture according to claim 15 wherein the sweetening agent is sucrose or a mixture of sucrose and corn syrup solids.

18. A dry, particulate, homogeneous mixture according to claim 16 wherein the ratio of CMC to xanthan gum is about 0.5:1.0.

19. A dry, particulate, homogeneous mixture according to claim 14 wherein the weight ratio of CMC to the first stabilizer is between about 0.33:1.0 and 0.66:1.0.

20. A dry, particulate homogeneous mixture according to claim 19 wherein stabilizing mixture is present in amounts ranging from about 0.40 to 1.1% by weight.

21. A dry, particulate homogeneous mixture according to claim 14 wherein the flavoring agent an artificial flavor and is present in amounts ranging from about 0.04 to 2.8% by weight.

22. A dry particulate homogeneous mixture according to claim 14 wherein the flavoring agent is a natural fruit powder and is present in amounts ranging from about 0.8 to 27.8% w.

* * * * *